United States Patent [19]

Oka et al.

[11] Patent Number: 5,663,287

[45] Date of Patent: Sep. 2, 1997

[54] POLYIMIDE AND PROCESS FOR PRODUCING THE SAME

[75] Inventors: Osamu Oka; Takeshi Hashimoto; Takeshi Nishigaya; Tatsuya Hariko, all of Shizuoka, Japan

[73] Assignee: Tomoegawa Paper Co., Ltd., Tokyo, Japan

[21] Appl. No.: 609,322

[22] Filed: Mar. 1, 1996

[30] Foreign Application Priority Data

Mar. 3, 1995 [JP] Japan ................................ 7-068866
Sep. 14, 1995 [JP] Japan ................................ 7-261028

[51] Int. Cl.⁶ ............................................ C08G 73/10
[52] U.S. Cl. ................ 528/350; 528/352; 528/353; 528/360; 528/363; 528/367; 528/310; 528/171; 528/172; 528/176; 528/184; 528/185; 528/188
[58] Field of Search ............................. 528/350, 352, 528/353, 360, 363, 367, 310, 171, 172, 176, 184, 185, 188

[56] References Cited

U.S. PATENT DOCUMENTS

| 5,508,357 | 4/1996 | Matsuura et al. | 525/420 |
| 5,510,425 | 4/1996 | Matsuura et al. | 525/423 |

FOREIGN PATENT DOCUMENTS

| 43-5911 | 3/1968 | Japan. |
| 43-18914 | 8/1968 | Japan. |
| 60-258225 | 12/1985 | Japan. |
| 62-10051 | 1/1987 | Japan. |
| 263116 | 10/1989 | Japan. |
| 263117 | 10/1989 | Japan. |
| 11633 | 1/1990 | Japan. |
| 78481 | 3/1993 | Japan. |

*Primary Examiner*—W. Robinson H. Clark
*Attorney, Agent, or Firm*—Lowe, Price, LeBlanc & Becker

[57] ABSTRACT

The present invention provide a novel polyimide which is soluble in organic solvents and excels in heat resistance, and to a process for producing the polyimide. The polyimide of the present invention comprises a repeating unit represented by the formula (1) and having a number average molecular weight of from 4,000 to 200,000.

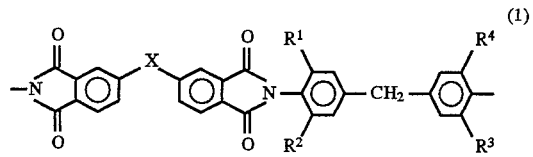

wherein X is $-SO_2-$ or $-C(=O)-OCH_2CH_2O-C(=O)-$, and $R^1$, $R^2$, $R^3$ and $R^4$ are independently an alkyl group having 1 to 4 carbon atoms or an alkoxy group having 1 to 4 carbon atoms.

15 Claims, No Drawings

POLYIMIDE AND PROCESS FOR PRODUCING THE SAME

BACKGROUND OF THE INVENTION

1. Field of the Invention

This invention relates to a novel polyimide which is soluble in organic solvents and excels in heat resistance, and to a process for producing the same.

2. Related Art

Generally, polyamide resins excel in heat resistance, but many of them have poor processing abilities due to their insolubility and infusibility. For this reason, in order to form a polyimide into a film, etc., a process for obtaining a polyamide mold by using a varnish with a polyamic acid, which is a precursor of the polyimides, dissolved in an organic solvent for molding and processing, and carrying out imidation through a dehydration ring closure reaction. However, since the polyamic acid varnish easily undergoes hydrolysis and amide interchange reaction, it is necessary for preventing the polyamic acid varnish from being changed into a low molecular weight form and from gelation to store it at a low temperature. Furthermore, since the solvent used easily absorbs moisture, there is a problem that the moistened resin is separated from the varnish. Moreover, there is also a problem that after the formation of the film, etc., the condensed water formed during the imidation reaction forms voids in the products. In addition, since a high temperature of not less than 300° C. is required for carrying out the imidation reaction, it is very difficult to provide a polyimide coating layer on a base having no heat resistance.

Consequently, in order to solve the problems associated with the polyimide, studies and developments have been made to obtain polyimides capable of forming and processing by selecting a raw material having solubility in an organic solvent or having a softening point, and many suggestions have been made. For example, Japanese Patent Laid-Open 10051/1987 discloses a polyimide obtainable from a diamine represented by the following formula (12) and pyromellitic acid. However, this polyimide has a softening point of not less than 300° C. and has forming and processing ability, but since it is bad soluble in an organic solvent, a varnish of polyimide, which is a precursor, must be used for forming a film, etc. The problems described above have yet been left.

carboxylic dianhydride such as biphenyltetracarboxylic dianhydride or pyromellitic dianhydride. These polyimides are soluble in N-methyl-2-pyrrolidone and m-cresol, and have a glass transition temperature of not less than 400° C. However, these solvents which have high boiling points are not suitable for forming films, etc.

Japanese Patent Publication 18914/1968 discloses a polyimide obtainable from p-phenylenebis(trimellitate) dianhydride and a diamine such as benzidine and 4,4'-diaminodiphenyl ether, etc., and Japanese Patent Publication 5911/1968 discloses that bisphenol A bistrimellitate dianhydride may be used as raw materials for a polyimide. However, the polyimides obtainable by these processes have not yet been reported to be dissolved in a low polar solvent.

Japanese patent Laid-Open 258225/1985 discloses a polyimide obtainable from 1,4-bis(p-aminocumyl)benzene and an aromatic acid dianydride or aliphatic acid dianhydride. The polyimide has merits that it is soluble in N-methyl-2-pyrrolidone and its glass transition point is lower than 200° C., but has demerits that it is insoluble in a low polar solvent and a low boiling-point solvent and its heat resistance is low as for the mechanical strength. Japanese patent Laid-Open 11633/90 discloses a process for producing a polyimide from a diamine as represented by the above formula (12) and bisphenol A bistrimellitate dianhydride. The polyimide is not only soluble in N-methyl-2-pyrrolidone but also in N,N-dimethylformamide, dioxane, etc., but is insoluble in diethylene glycol dimethyl ether. Furthermore, the diamine described above is difficult to be produced, which indicate the difficulty of industrially carrying out this process for producing a polyimide.

Japanese Patent Laid-Open 78481/93 discloses a polyimide obtained from a diamine represented by formula (8) and bisphenol A bistrimellitate dianhydride or a dianhydride represented by the following formula (13). The polyimide is not only soluble in N-methyl-2-pyrrolidone and N,N-dimethylformamide, but also in dioxane, tetrahydrofuran, diethylene glycol dimethyl ether, toluene, etc. However, since the acid dianhydride which is the raw material is difficult to be produced in high purity, the process is proven to be inadequate for industrial production. No polyimide having sufficient flexibility is obtainable from a diamine represented by the formula (8) (in this patent, $R^1=R^2=R^3=R^4=$isopropyl) and bisphenol A bistrimellitate dianhydride.

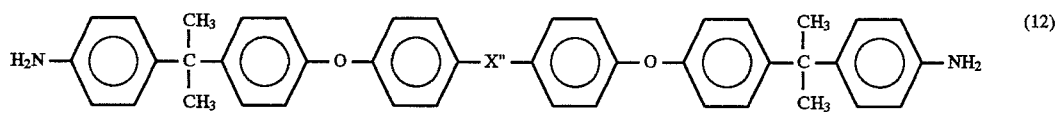

(12)

wherein X" is —SO$_2$— or —C(=O)—.

Japanese Patent Laid-Open 263116/1988 and Japanese Patent Laid-Open 263117/1988 disclose polyimides obtainable from 4,4'-methylenebis(2,6-dialkylaniline) and a tetra-

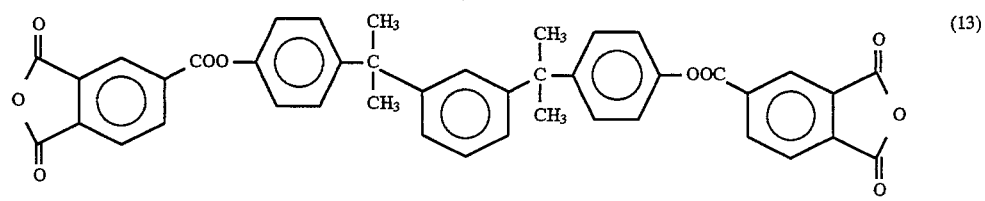

(13)

In light of such situations, the present invention has been done to make an improvement. An object of the present invention is, therefore, to provide a novel polyimide which is soluble in various organic solvents and which excels in heat resistance and a process for producing the same.

SUMMARY OF THE INVENTION

The polyimide of the present invention contains a repeating unit represented by the following formula (1) and has a number average molecular weight of from 4,000 to 200,000.

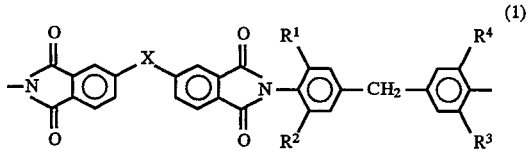
(1)

wherein X is —$SO_2$— or —C(=O)—$OCH_2CH_2O$—C(=O)—, and $R^1$, $R^2$, $R^3$ and $R^4$ are independently an alkyl group having 1 to 4 carbon atoms or an alkoxy group having 1 to 4 carbon atoms.

The polyimide according to the first aspect of the present invention is a polyimide consisting of a repeating unit represented by the formula (1) and having a number average molecular weight of from 4,000 to 200,000.

The polyimide according to the second aspect of the present invention is a polyimide consisting of repeating units represented by the following formulae (2) and (3) and having a number average molecular weight of 4,000 to 200,000, and the proportion of these repeating units being voluntary. In the case of this polyimide, when the proportion of the repeating unit represented by the formula (3) is higher, the glass transition point may be lowered.

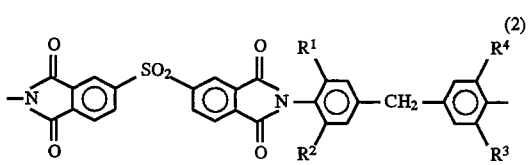
(2)

wherein $R^1$, $R^2$, $R^3$ and $R^4$ are independently an alkyl group having 1 to 4 carbon atoms, or an alkoxy group having 1 to 4 carbon atoms.

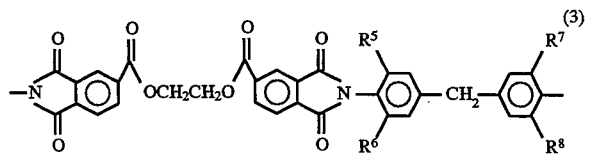
(3)

wherein $R^5$, $R^6$, $R^7$ and $R^8$ are independently an alkyl group having 1 to 4 carbon atoms, or an alkoxy group having 1 to 4 carbon atoms.

The polyimide according the third aspect of the present invention is a polyimide comprising a repeating unit represented by the formula (1) or repeating units represented by the formulae (2) and (3) and a repeating unit represented by the following formula (4), and having a number average molecular weight of 4,000 to 200,000. In this polyimide, it is preferred that the proportion of the repeating unit represented by the formula (1) or the repeating units represented by the formulae (2) and (3) is 40 to 99 mol %, and that of the repeating unit represented by the formula (4) is 60 to 1 mol %. When the proportion of the repeating unit represented by the formula (4) exceeds 60 mol %, the solubility in a solvent is drastically decreased. In particular, in the case where a high solubility in a solvent is required, the proportion of the repeating unit represented by the formula (4) is desirably not more than 30%. The polyimide comprising less than 1 mol % of the repeating unit represented by the formula (4) has no drastic change in the characteristics exhibited by the introduction of the Ar group in comparison with the polyimides of the first and the second aspect.

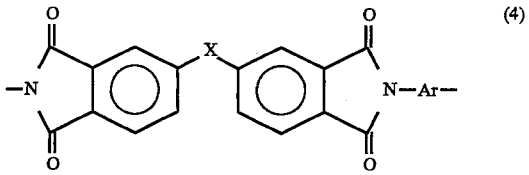
(4)

wherein X is —$SO_2$— or —C(=O)—$OCH_2CH_2O$—C(=O)—, and Ar is a divalent group having 1 to 6 benzene rings, provided that Ar represented by the following formula is excluded out.

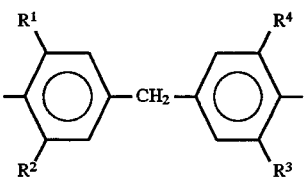

wherein $R^1$, $R^2$, $R^3$ and $R^4$ are independently an alkyl group having 1 to 4 carbon atoms, or an alkoxy group having 1 to 4 carbon atoms.

The polyimide of the fourth aspect of the present invention is a polyimide comprising a repeating unit represented by the formula (1) or repeating units represented by the formulae (2) and (3) and a repeating unit represented by the following formula (5), and having a number average molecular weight of 4,000 to 200,000. In this polyimide, it is preferred that the proportion of the repeating unit represented by the formula (1) or the repeating units represented by the formulae (2) and (3) is 40 to 99 mol %, and that of the repeating unit represented by the formula (5) is 60 to 1 mol %. When the proportion of the repeating unit represented by the formula (5) exceeds 60 mol %, the solubility in a solvent is drastically decreased, and glass transition point and temperature of initiating thermal decomposition becomes remarkably low. In particular, in the case where a high temperature of initiating thermal decomposition is required, the proportion of the repeating unit represented by the formula (5) is desirably not more than 30%. The polyimide comprising less than 1 mol % of the repeating unit represented by the formula (5) has no drastic change in the characteristics exhibited by introduction of the R group in comparison with the polyimides of the first and the second aspect.

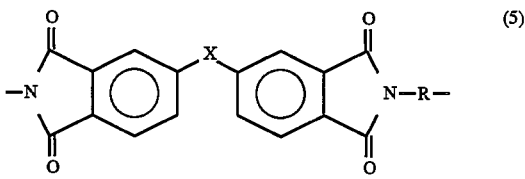
(5)

wherein X is —$SO_2$— or —C(=O)—$OCH_2CH_2O$—C(=O)—, and R is an alkylene group having 2 to 20 carbon atoms or a dimethylsiloxane group represented by the formula: —R'—[Si($CH_3$)$_2$O]$_n$Si($CH_3$)$_2$—R'— where R' is an alkylene group having 1 to 10 carbon atoms or phenoxymethylene group and n is an integer of from 1 to 20.

The polyimide of the fifth aspect of the present invention is a polyimide comprising a repeating unit represented by the formula (1) or repeating units represented by the formulae (2) and (3) and a repeating unit represented by the following formula (6), and having a number average molecular weight of 4,000 to 200,000. In this polyimide, it is preferred that the proportion of the repeating unit represented by the formula (1) or the repeating units represented by the formulae (2) and (3) is 40 to 99 mol %, and that of the repeating unit represented by the formula (6) is 60 to 1 mol %. When the proportion of the repeating unit represented by the formula (6) exceeds 60 mol %, the solubility in a solvent is drastically decreased. In particular, in the case where a high solubility in a solvent is required, the proportion of the repeating unit represented by the formula (6) is desirably not more than 030%. The polyimide comprising less than 1 mol % of the repeating unit represented by the formula (6) has no drastic change in the characteristics exhibited by introduction of the repeating unit represented by the formula (6) in comparison with the polyimides of the first and the second aspect.

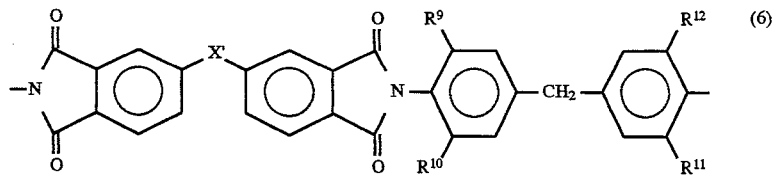

(6)

wherein X' is a direct bond, —O—, —C(=O)—, —C(CH$_3$)$_2$— or —C(CF$_3$)$_2$—, and R$^9$, R$^{10}$, R$^{11}$ and R$^{12}$ are independently an alkyl group having 1 to 4 carbon atoms or an alkoxy group having 1 to 4 carbon atoms.

The polyimides of the first and the second aspects can be produced by reacting a tetracarboxylic dianhydride represented by the following formula (7) with a compound represented by the following formula (8).

 (7)

wherein X is —SO$_2$— or —C(=O)—OCH$_2$CH$_2$O—C(=O)—.

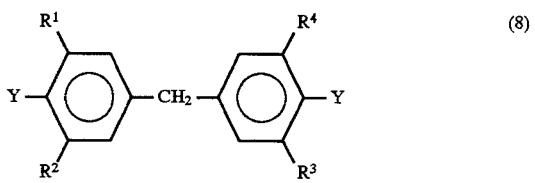 (8)

wherein R$^1$, R$^2$, R$^3$ and R$^4$ are independently an alkyl group having 1 to 4 carbon atoms, or an alkoxy group having 1 to 4 carbon atoms, and Y is an amino group or isocyanate group.

The polyimide of the third aspect can be produced by reacting a tetracarboxylic dianhyride represented by the formula (7) with a compound represented by the formula (8) and a compound represented by the following formula (9).

Y—Ar—Y (9)

wherein Ar is a divalent group having 1 to 6 benzene rings and Y is an amino group or isocyanate group, provided that he Ar represented by the following formula is excluded out.

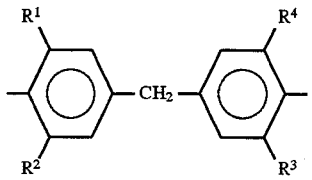

wherein R$^1$, R$^2$, R$^3$ and R$^4$ are independently an alkyl group having 1 to 4 carbon atoms, or an alkoxy group having 1 to 4 carbon atoms.

The polyimide of the fourth aspect can be produced by reacting a tetracarboxylic dianhydride represented by the formula (7) with a compound represented by the formula (8) and a compound represented by the following formula (10).

Y—R—Y (10)

wherein R is an alkylene group having 2 to 20 carbon atoms or a dimethylsiloxane group represented by the formula: —R'— [Si(CH$_3$)$_2$O]$_n$Si(CH$_3$)$_2$—R'— where R' is an alkylene group having 1 to 10 carbon atoms or phenoxymethylene group and n is an integer of from 1 to 20, and Y is an amino group or isocyanate group.

The polyimide of the fifth aspect can be produced by reacting a tetracarboxylic dianhyride represented by the formula (7) with a compound represented by the formula (8) and a compound represented by the following formula (11).

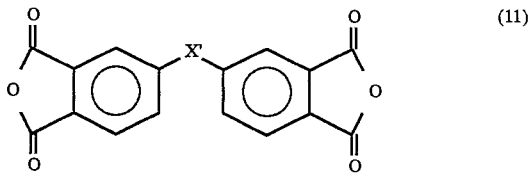 (11)

wherein X' is a direct bond, —O—, —C(=O)—, —C(CH$_3$)$_2$—, or —C(CF$_3$)$_2$—.

DETAILED DESCRIPTION OF PREFERRED EMBODIMENTS

The embodiments of the present invention will now be described in detail.

In the polyimides of the present invention, examples of tetracarboxylic dianhyrides represented by the formula (7) which forms the basic construction of the polyimides include two type compounds where X in the formula (7) is —SO$_2$— or X is —C(=O)—OCH$_2$CH$_2$O—C(=O)—, i.e., 3,3', 4,4'-diphenylsulfonetetracarboxylic dianhydride and ethylene glycol bistrimelitate dianhydride.

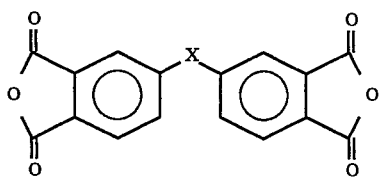 (7)

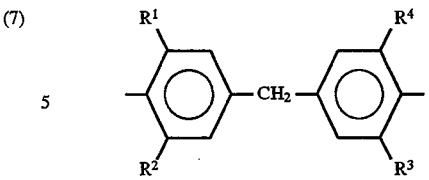

In the polyamides of the present invention, the diphenylmethane derivatives represented by the formula (8) which make up an another basic construction of the polyimides are those having an amino group or isocyanate group as the functional group of Y.

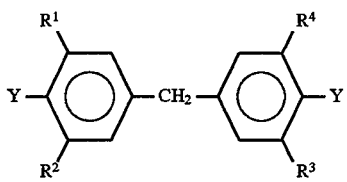 (8)

Examples of the diamines where the functional group Y is amino group include 4,4'-diamino-3,3', 5,5'-tetramethyldiphenylmethane, 4,4'-diamino-3,3', 5,5'-tetraethyldiphenylmethane, 4,4'-diamino-3,3', 5,5'-tetra(n-propyl)diphenylmethane, 4,4'-diamino-3,3', 5,5'-tetraisopropyldiphenylmethane, 4,4'-diamino-3,3', 5,5'-tetrabutyldiphenylmethane, 4,4'-diamino-3.,3'-dimethyl-5, 5'-diethyldiphenylmethane, 4,4'-diamino-3,3'-dimethyl-5,5'-diisopropyldiphenylmethane, 4,4'-diamino-3,3'-dimethyl-5, 5'-dibutyldiphenylmethane, 4,4'-diamino-3,3'-diethyl-5,5'-diisopropyldiphenylmethane, 4,4'-diamino-3,3'-diethyl-5,5'-dibutyldiphenylmethane, 4,4'-diamino-3,3'-diisopropyl-5,5'-dibutyldiphenylmethane, 4,4'-diamino-3,5-dimethyl-3 '5'-diethyldiphenylmethane, 4,4'-diamino-3,5-dimethyl-3'5'-diisopropyldiphenylmethane, 4,4'-diamino-3,5-dimethyl-3'5'-dibutyldiphenylmethane, 4,4'-diamino-3,5-diethyl-3'5'-diisopropyldiphenylmethane, 4,4'-diamino-3,5-diethyl-3'5'-dibutyldiphenylmethane, 4,4'-diamino-3,5-diisopropyl-3'5'-dibutyldiphenylmethane, 4,4'-diamino-3,3', 5,5'-tetramethoxydiphenylmethane, 4,4'-diamino-3,3 ', 5,5'-tetraethoxydiphenylmethane, 4, 4'-diamino-3,3', 5,5'-tetra(n-propoxy)diphenylmethane, 4,4'-diamino-3,3', 5,5'-tetraisopropoxydiphenylmethane, 4,4'-diamino-3,3', 5,5'-tetrabutoxydiphenylmethane, and the like. Examples of isocyanates which are the derivatives represented by the formula (8) wherein the functional group Y is an isocyanate group include those exemplified in the above mentioned diamines in which "amino" is replaced by "isocayanate".

In the present invention, the compounds represented by the formula (9) used for obtaining the polyimide of the third aspect by reacting with the compound represented by the formula (7) and the compound represented by the formula (8) include those having 1 to 6 benzene groups as Ar. It is preferable for enhancing the solubility of the resulting polyimide in a solvent that Ar preferably comprises two or more benzene ring connected via —O—, —S—, —CH$_2$—, —C(=O)—, —CONH—, —COO—, —SO$_2$—, —C(CH$_3$)$_2$—, —C(CF$_3$)$_2$—, etc. in straight form and in the meta or para position. The hydrogens in each benzene rings may optionally be substituted with substituents, provided that Ar represented by the following formula is excluded out:

wherein R$^1$, R$^2$, R$^3$ and R$^4$ are independently an alkyl group having 1 to 4 carbon atoms, or an alkoxy group having 1 to 4 carbon atoms.

$$Y-Ar-Y \qquad (9)$$

Typical examples of the diamine in the compound represented by the formula (9) wherein the functional group Y is amino group are p-phenylenediamine, m-phenylenediamine, tollylenediamine, xylylenediamine, 3,4'-oxydianiline, 4,4'-oxydianiline, 4,4'-diaminodiphenyl-methane, 3,4'-diaminodiphenylmethane, 3,3'-diaminodiphenyl-methane, 4,4'-diamino-3,3'-dimethyldiphenylmethane, 4,4'-diamino-3,3'-diethyldiphenylmethane, 4,4'-diamino-3,3'-dimethoxy-diphenylmethane, 4,4'-diamino-3,3'-diethoxy-diphenylmethane, 4,4'-diaminobenzanilide, 4,4'-diaminobenzophenone, 3,3'-diaminobenzophenone, 4,4'-diaminodiphenylsulfone, 3,3'-diaminodiphenylsulfone, 4,4'-(isopropylidene)dianiline, 3,3'-(isopropylidene)dianiline, 4,4'-diaminobenzophenone, bis[2-(4-aminophenyl)propane]-benzene, bis(aminophenoxy)benzene, bis(aminophenoxy)-biphenyl, bis(aminophenoxy)diphenyl ether, bis(aminodiphenoxyphenyl)propane, phenoxyphenyl)propane, bis(aminophenoxyphenyl)-sulfone, bis(aminophenoxyphenyl) ketone, bis(aminophenoxy-phenyl)hexafluoropropane, bis(aminophenoxyphenyl)bihenyl, bis(aminophenoxyphenyl) diphenyl ether, 4,4'-bis[3-(4-amino-α, α'-dimethylbenzyl)phenoxy]diphenylsulfone, 4,4'-bis[3-(4-amino- α, α'-dimethylbenzyl)phenoxy]benzophenone, 4,4'-bis[4-(4-amino-α, α'-dimethylbenzyl)phenoxy]diphenyl-sulfone, 4,4'-bis[4-(4-amino-α, α'-dimethylbenzyl)phenoxy]-benzophenone, and the like, and they can be used as a mixture. Examples of diisocyanates in the compounds represented by the formula (9) wherein the functional group Y is Isocyanate group include those exemplified in the above diamine in which "amino" is replaced by "isocyanate", in addition to diphenylmetahane diisocyanate, tollylene diisocyanate, and the like.

The compounds represented by the following formula (10) used for obtaining the polyimide of the fourth aspect by reacting with the compound of the formula (7) and the compound of the formula (8) include those wherein R is an alkylene group having 2 to 20 carbon atoms, or dimethylsiloxane group represented by formula: —R'—[Si(CH$_3$)$_2$O]$_n$Si(CH$_3$)$_2$—R'— wherein R' is an alkylene group having 1 to 10 carbon atoms or phenoxymethylene group, and n is an integer of from 1 to 20, and typical examples include 1,3-bis(3-aminopropyl)-1,1,3,3-tetramethyldisiloxane, 1,3-bis(10-aminodecyl)-1,1,3,3 -tetramethyldisiloxane, bis(m-aminophenoxymethyl)-1,1,3,3-tetramethyldisiloxane, α, ω-bis(3-aminopropyl)polydimethyl-siloxane represented by the following constructual formula:

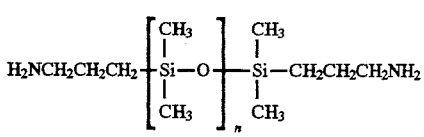

wherein n is 3 or 7, and the like.

$$Y-R-Y \tag{10}$$

Examples of the diamines in the compounds represented by the formula (10) wherein the functional group Y is amino include ethylenediamine, propylenediamine, 1,4-diaminobutane, hexamethylenediamine, octamethylenediamine, decamethylenediamine, hexadecamethylenediamine, dodecamethylenediamine, bis(3-aminopropyl)tetramethyl-disiloxane, tetramer and octamer of dimethylsiloxane having aminopropyl at the terminal, bis(3-aminophenoxy-methyl)tetramethyldisiloxane, etc., and they can be used as a mixture. Examples of the diisocyanates in the compounds represented by the formula (10) wherein the functional group Y is isocyanate include those exemplified in the above diamines wherein "amino" is replaced by "isocyanate".

The diisocyanates in the compounds represented by the formulae (8), (9) and (10) wherein the functional group Y is isocyanate can easily be produced by reacting the corresponding diamine described above with phosgene according to the usual method.

Examples of the tetracarboxylic dianhydrides represented by the following formula (11) used for obtaining the polyimides of the fifth aspect by reacting with the compound of the formula (7) and the compound of the formula (8) include five types wherein X' in the formula (11) is a direct bond, —O—, —C(=O)—, —C(CH$_3$)$_2$—, and —C(CF$_3$)$_2$—, and typical examples are 3,3', 4,4'-biphenyl-tetracarboxylic dianhydride, 3,3', 4,4'-diphenylether-tetracarboxylic dianhydride, 3,3', 4,4'-benzophenone-tetracarboxylic dianhydride,4,4'-(isopropylidene)-diphthalic anhydride, and 4,4'-(hexafluoropropylidene)-diphthalic anhydride. They can be used as a mixture.

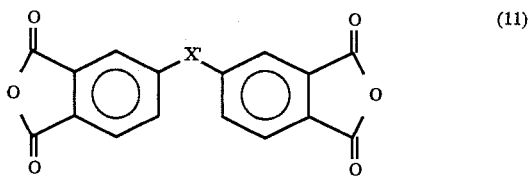

The polyimides of the first to the fifth aspects of the present invention are novel polyimides produced from the raw materials as described above and are required to have a number average molecular weight of 4,000 to 200,000, and preferably from 8,000 to 100,000. If the number average molecular weight is less than 4,000, the film forming ability becomes insufficient, and the resulted film is inferior in heat resistance even if the film can be formed. If it is unduly high, i.e., exceeding 200,000, the solubility in an organic solvent becomes poor, or if the product is dissolved, due to a high viscosity of the solution, the product is difficult to be processed.

The number average molecular weight used in the present invention is a value determined by gel permeation chromatography (GPC), and indicated as polystyrene using tetrahydrofuran as an eluent and Shodex 80M×2 as columns.

The process for producing the polyimide of the present invention will now be described.

Processes for producing the polyimide using a tetracarboxylic dianhyride and diamine as the raw materials for the polyimide include:. a process for directly obtaining a polyimide by heating a tetracarboxylic dianhyride and diamine in an organic solvent, optionally in the presence of a catalyst (in an amount of not more than 20 parts by weight of the reactants) such as tributylamine, triethylamine, or triphenyl phosphonate to a temperature of not less than 100° C., and preferably not less than 180° C. A process for obtaining a polyimide by reacting a tetracarboxylic dianhyride with a diamine in an organic solvent at a temperature of not more than 100° C. to obtain a polyamic acid which is a precursor of the polyimide, optionally adding a dehydrating such as p-toluenesulfonic acid (in an amount of 1 to 5 time mol of the tetracarboxylic dianhydride), and then heating the solution to cause an imidation. A process in which the above-mentioned polyamic acid is caused to a ring closing reaction at a relatively low temperature in a range of from room temperature to 100° C. by adding dehydrating ring closing agent such as an anhydride, e.g., acetic anhydride, propionic anhydride or benzoic anhydride, a carbodiimide compound, e.g., dicylohexylcarbodiimide, and optionally a ring closing catalyst (as for the dehydrating ring closing agent and ring closing catalyst, in an amount of 2 to 10 time mol of the tetracarboxylic dianhydride).

Examples of the organic solvents used in this reaction include aprotic polar solvents such as N-methyl-2-pyrrolidone, N,N-dimethylacetamide, N,N-dimethylformamide, dimethylsulfoxide, sulforane, hexamethylphosphoric acid triamide, and 1,3-dimethyl-2-imidazolidone, and phenol solvents such as phenol, cresol, xylenol, and p-chlorophenol. Optionally, solvents such as benzene, toluene, xylene, methyl ethyl ketone, acetone, tetrahydrofuran, dioxane, monoglyme, diglyme, methyl cellosolve, cellosolve acetate, methanol, ethanol, isopropanol, methylene chloride, chloroform, tricren, and nitrobenzene can be mixed with the above-mentioned solvents as a mixture.

In the case where a tetracarboxylic dianhydride and a diisocyanate are used as the raw materials, the product can be produced according to the above-mentioned process for directly obtaining a polyimide. In this case, the reaction temperature is not less than room temperature, and particularly higher than 60° C.

In the present invention, the polyimides having a high polymerization degree can be produced by the reaction between equimolar amounts of tetracarboxylic dianhydride and the diamine or diisocyanate and, if necessary, the polyimides can be produced using any of the raw materials in an excess of 10 mol % or less.

The polyimide resins obtained by the present invention are soluble in various organic solvents such as aprotic polar solvents, e.g., N-methyl-2-pyrollidone, N,N-dimethylacetamide, N,N-dimethylformamide, dimethylsulfoxide, sulforane, hexamethylphosphoric acid triamide, and 1,3-dimethy2-imidazolidone, and phenol solvents such as phenol, cresol, xylenol, and p-chlorophenol, isophorone, cyclohexanone, carbitol acetate, diglyme, dioxane, tetrahydrofuran, etc., and have a thermal decomposition temprature of higher than 400° C.

Since the polyimide of the present invention are soluble in various organic solvent from low boiling point solvents to high boiling point solvent as described above, they have a merit of easy molding and processing. Also, they have a softening temperature and excellent heat resistance at the same time. Consequently, the polyimides obtained by the present invention have widened applied fields as varnish, molded articles, adhesives, constructing materials, and the like.

EXAMPLE

The present invention will now be described in greater detail.

Example 1

Into a flask equipped with a stirrer were introduced 12.72 g (50 mmol) of 4,4'-diamino-3,3' 5,5'-tetramethyldiphenylmethane, 17.91 g (50 mmol) of 3,3', 4,4'-diphenylsulfonetetracarboxylic dianhydride, and 150 ml of N-methyl-2-pyrrolidone at an iced temperature, and stirring was continued for 1 hour. Consequently, the solution was reacted at 40° C. for 3 hours to synthesize a polyamic acid. To the resulting polyamic acid were added 50 ml of toluene and 1.0 g of p-toluenesulfonic acid, the mixture was heated to 160° C., and an imidation reaction was carried out for 3 hours while separating water which was flowed by being azeotropically distilled with toluene. After toluene was distilled off, the resulting polyimide varnish was poured in methanol, and the separation of the resulting precipitate, pulverization, washing, and drying stages gave 27.4 g of a polyimide of the first aspect comprising a repeating unit of formula (1). The IR spectrum measurement of the resulting polyimide showed typical absorption bands of imide at $1720 cm^{-1}$ and $1780 cm^{-1}$. The results of measuring the molecular weight, glass transition point and temperature of initiating thermal decomposition of the polyimide are shown in Table 1.

The solubility of this polyimide was confirmed by observing the state of the solving after 5% by weight solution was left standing for 12 hours at room temperature. As a result, the polyimide was soluble in solvents of N-methyl-2-pyrrolidone, N,N-dimethylacetamide, N,N-dimethylformamide, dimethylsulfoxide, sulforane, hexamethylphosphoric acid triamide, 1,3-dimethyl-2-imidazolidone, phenol, cresol, xylenol, p-chlorophenol, cyclohexanone, carbitol acetate, diglyme, dioxane, and tetrahydrofuran (THF).

The polyimide was dissolved in THF so as to be a concentration of 20% by weight, the resulting varnish was cast on a glass plate, dried at.100° C. for 10 minutes. This gave almost transparent self-supporting tough film. When the film was bent 180 degree in order to carry out a flexibility test, the film showed good flexibility without cracking.

Example 2

Using 15.52 g (50 mmol) of 4,4'-diamino-3,3', 5,5'-tetraethyldiphenylmethane, 17.91 g (50 mmol) of 3,3', 4,4'-diphenylsulfonetetracarboxylic dianhydride and 150 ml of N-methyl-2-pyrrolidone, 30.0 g of a polyimide of the first aspect comprising the structural unit represented by the formula (1) was obtained as in Example 1.

The IR spectrum measurement of the resulting polyimide showed typical absorption bands of imide at $1720 cm^{-1}$ and $1780 cm^{-1}$. The results of measuring the molecular weight, glass transition point and temperature of initiating thermal decomposition of the polyimide are shown in Table 1.

The solubility test and the flexibility test of the resulting polyimide determined as in Example 1 gave the results similar to those of Example 1.

Example 3

Using 12.72 g (50 mmol) of 4,4'-diamino-3,3', 5,5'-tetramethyldiphenylmethane, 20.51 g (50 mmol) of ethylene glycol bistrimellitate dianhydride and 150 ml of N-methyl-2-pyrrolidone, 30.0 g of a polyimide of the first aspect comprising the structural unit represented by the formula (1) was obtained as in Example 1.

The IR spectrum measurement of the resulting polyimide showed typical absorption bands of imide at $1720 cm^{-1}$ and $1780 cm^{-1}$. The results of measuring the molecular weight, glass transition point and temperature of initiating thermal decomposition of the polyimide are shown in Table 1.

The solubility test and the flexibility test of the resulting polyimide determined as in Example 1 gave the results similar to those of Example 1.

Example 4

Using 15.52 g (50 mmol) of 4,4'-diamino-3,3', 5,5'-tetraethyldiphenylmethane, 20.51 g (50 mmol) of ethylene glycol bistrimellitate dianhydride and 150 ml of N-methyl-2-pyrrolidone, 33.5 g of a polyimide of the first aspect comprising the repeating unit represented by the formula (1) was obtained as in Example 1.

The IR spectrum measurement of the resulting polyimide showed typical absorption bands of imide at $1720 cm^{-1}$ and $1780 cm^{-1}$. The results of measuring the molecular weight, glass transition point and temperature of initiating thermal decomposition of the polyimide are shown in Table 1.

The solubility test and the flexibility test of the resulting polyimide determined as in Example 1 gave the results similar to those of Example 1.

Example 5

Using 15.52 g (50 mmol) of 4,4'-diamino-3,3', 5,5'-tetraethyldiphenylmethane, 13.34 g (37.5 mmol) of 3,3', 4,4'-diphenylsulfonetetracarboxylic dianhydride, 5.13 g (12.5 mmol) of ethylene glycol bistrimellitate dianhydride and 150 ml of N-methyl-2-pyrrolidone, 37.6 g of a polyimide of the second aspect comprising the repeating unit represented by the formulae (2) and (3) was obtained as in Example 1.

The IR spectrum measurement of the resulting polyimide showed typical absorption bands of imide at $1720 cm^{-1}$ and $1780 cm^{-1}$. The results of measuring the molecular weight, glass transition point and temperature of initiating thermal decomposition of the polyimide are shown in Table 1.

The solubility of this polyimide was confirmed by observing the state of the solving after 5% by weight solution was left standing for 12 hours at room temperature. As a result, the polyimide was soluble in solvents of N-methyl-2-pyrrolidone, N,N-dimethylacetamide, N,N-dimethylformamide, dimethylsulfoxide, sulforane, hexamethylphosphoric acid triamide, 1,3-dimethyl-2-imidazolidone, phenol, cresol, xylenol, p-chlorophenol, cyclohexanone, carbitol acetate, diglyme, dioxane, and tetrahydrofuran (THF).

The polyimide was dissolved in THF so as to be a concentration of 20% by weight, the resulting varnish was cast on a glass plate, dried at 100° C. for 10 minutes. This gave almost transparent self-supporting tough film. When the film was bent 180 degree in order to carry out a flexibility test, the film showed good flexibility without cracking.

Example 6

Using 15.52 g (50 mmol) of 4,4'-diamino-3,3', 5,5'-tetraethyldiphenylmethane, 8.89 g (25 mmol) of 3,3', 4,4'-diphenylsulfonetetracarboxylic dianhydride, 10.26 g (25 mmol) of ethylene glycol bistrimellitate dianhydride and 150 ml of N-methyl-2-pyrrolidone, 31.2 g of a polyimide of the second aspect comprising the repeating unit represented by the formulae (2) and (3) was obtained as in Example 1.

The IR spectrum measurement of the resulting polyimide showed typical absorption bands of imide at 1720cm$^{-1}$ and 1780cm$^{-1}$. The results of measuring the molecular weight, glass transition point and temperature of initiating thermal decomposition of the polyimide are shown in Table 1.

The solubility test and the flexibility test of the resulting polyimide determined as in Example 5 gave the results similar to those of Example 5.

Example 7

Using 12.72 g (50 mmol) of 4,4'-diamino-3,3', 5,5'-tetramethyldiphenylmethane, 4.48 g (12.5 mmol) of 3,3', 4,4'-diphenylsulfonetetracarboxylic dianhydride, 15.39 g (37.5 mmol) of ethylene glycol bistrimellitate dianhydride and 150 ml of N-methyl-2-pyrrolidone, 29.3 g of a polyimide of the second aspect comprising the repeating unit represented by the formulae (2) and (3) was obtained as in Example 1.

The IR spectrum measurement of the resulting polyimide showed typical absorption bands of imide at 1720cm$^{-1}$ and 1780cm$^{-1}$. The results of measuring the molecular weight, glass transition point and temperature of initiating thermal decomposition of the polyimide are shown in Table 1.

The solubility test and the flexibility test of the resulting polyimide determined as in Example 5 gave the results similar to those of Example 5.

Example 8

Using 7.76 g (25 mmol) of 4,4'-diamino-3,3', 5,5'-tetraethyldiphenylmethane, 10.26 g (25 mmol) of 2,2-bis[4-(4-aminophenoxy)phenyl]propane, 17.91 g (50 mmol) of 3,3', 4,4'-diphenylsulfonetetracarboxylic dianhydride and 150 ml of N-methyl-2-pyrrolidone, 32.4 g of a polyimide of the third aspect comprising the repeating unit represented by formula (4) was obtained as in Example 1.

The IR spectrum measurement of the resulting polyimide showed typical absorption bands of imide at 1720cm$^{-1}$ and 1780cm$^{-1}$. The results of measuring the molecular weight, glass transition point and temperature for initiating thermal decomposition of the polyimide are shown in Table 1.

The solubility of this polyimide was confirmed by observing the state of the solving after 5% by weight solution was left standing for 12 hours at room temperature. As a result, the polyimide was soluble in solvents of N-methyl-2-pyrrolidone, N,N-dimethylacetamide, N,N-dimethylformamide, dimethylsulfoxide, sulforane, hexamethylphosphoric acid triamide, 1,3-dimethyl-2-imidazolidone, phenol, cresol, xylenol, p-chlorophenol, cyclohexanone, carbitol acetate, diglyme, dioxane, and tetrahydrofuran THF).

The polyimide was dissolved in THF so as to be a concentration of 20% by weight, the resulting varnish was cast on a glass plate, dried at 100° C. for 10 minutes. This gave almost transparent self-supporting tough film. When the film was bent 180 degree in order to carry out a flexibility test, the film showed good flexibility without cracking.

Example 9

Using 11.64 g (37.5 mmol) of 4,4'-diamino-3,3', 5,5'-tetraethyldiphenylmethane, 2.50 g (12.5 mmol) of 3,4'-oxydianiline, 17.91 g (50 mmol) of 3,3', 4,4'-diphenylsulfonetetracarboxylic dianhydride and 150 ml of N-methyl-2-pyrrolidone, 28.1 g of a polyimide of the third aspect comprising the repeating unit represented by the formula (4) was obtained as in Example 1.

The IR spectrum measurement of the resulting polyimide showed typical absorption bands of imide at 1720cm$^{-1}$ and 1780cm$^{-1}$. The results of measuring the molecular weight, glass transition point and temperature of initiating thermal decomposition of the polyimide are shown in Table 1.

The solubility test and the flexibility test of the resulting polyimide determined as in Example 8 gave the results similar to those of Example 8.

Example 10

Using 11.64 g (37.5 mmol) of 4,4'-diamino-3,3', 5,5'-tetraethyldiphenylmethane, 3.65 g (12.5 mmol) of 1,3-bis(4-aminophenoxy)benzene, 17.91 g (50 mmol) of 3,3', 4,4'-diphenylsulfonetetracarboxylic dianhydride and 150 ml of N-methyl-2-pyrrolidone, 29.5 g of a polyimide of the third aspect comprising the repeating unit represented by the formula (4) was obtained as in Example 1.

The IR spectrum measurement of the resulting polyimide showed typical absorption bands of imide at 1720cm$^{-1}$ and 1780cm$^{-1}$. The results of measuring the molecular weight, glass transition point and temperature of initiating thermal decomposition of the polyimide are shown in Table 1.

The solubility test and the flexibility test of the resulting polyimide determined as in Example 8 gave the results similar to those of Example 8.

Example 11

Using 11.64 g (37.5 mmol) of 4,4'-diamino-3,3', 5,5'-tetraethyldiphenylmethane, 4.31 g (12.5 mmol) of 1,3-bis[2-(4-aminophenyl)isopropylidene]benzene, 17.91 g (50 mmol) of 3,3', 4,4'-diphenylsulfonetetracarboxylic dianhydride and 150 ml of N-methyl-2-pyrrolidone, 30.1 g of a polyimide of the third aspect comprising the repeating unit represented by the formula (4) was obtained as in Example 1.

The IR spectrum measurement of the resulting polyimide showed typical absorption bands of imide at 1720cm$^{-1}$ and 1780cm$^{-1}$. The results of measuring the molecular weight, glass transition point and temperature of initiating thermal decomposition of the polyimide are shown in Table 1.

The solubility test and the flexibility test of the resulting polyimide determined as in Example 8 gave the results similar to those of Example 8.

Example 12

Using 11.64 g (37.5 mmol) of 4,4'-diamino-3,3', 5,5'-tetraethyldiphenylmethane, 5.41 g (12.5 mmol) of bis[4-(3-aminophenoxy)phenyl]sulfone, 17.91 g (50 mmol) of 3,3', 4,4'-diphenylsulfonetetracarboxylic dianhydride and 150 ml of N-methyl-2-pyrrolidone, 31.2 g of a polyimide of the third aspect comprising the repeating unit represented by the formula (4) was obtained as in Example 1.

The IR spectrum measurement of the resulting polyimide showed typical absorption bands of imide at 1720cm$^{-1}$ and 1780cm$^{-1}$. The results of measuring the molecular weight, glass transition point and temperature of initiating thermal decomposition of the polyimide are shown in Table 1.

The solubility test and the flexibility test of the resulting polyimide determined as in Example 8 gave the results similar to those of Example 8.

Example 13

Using 11.64 g (37.5 mmol) of 4,4'-diamino-3,3', 5,5'-tetraethyldiphenylmethane, 7.91 g (12.5 mmol) of 4,4'-bis

[3-(4-amino-α, α'-dimethylbenzyl)phenoxy]benzophenone, 17.91 g (50 mmol) of 3,3', 4,4'-diphenylsulfonetetracarboxylic dianhydride and 150 ml of N-methyl-2-pyrrolidone, 33.9 g of a polyimide of the third aspect comprising the repeating unit represented by the formula (4) was obtained as in Example 1.

The IR spectrum measurement of the resulting polyimide showed typical absorption bands of imide at 1720cm$^{-1}$ and 1780cm$^{-1}$. The results of measuring the molecular weight, glass transition point and temperature of initiating thermal decomposition of the polyimide are shown in Table 1.

The solubility test and the flexibility test of the resulting polyimide determined as in Example 8 gave the results similar to those of Example 8.

Example 14

Using 7.76 g (25 mmol) of 4,4'-diamino-3,3', 5,5'-tetraethyldiphenylmethane, 6.21 g (25 mmol) of 1,3-bis(3-aminopropyl)-1,1,3,3-tetramethyldisiloxane, 17.91 g (50 mmol) of 3,3', 4,4'-diphenylsulfonetetracarboxylic dianhydride and 150 ml of N-methyl-2-pyrrolidone, 28.6 g of a polyimide of the fourth aspect comprising the repeating unit represented by the formula (5) was obtained as in Example 1.

The IR spectrum measurement of the resulting polyimide showed typical absorption bands of imide at 1720 cm$^{-1}$ and 1780cm$^{-1}$. The results of measuring the molecular weight, glass transition point and temperature of initiating thermal decomposition of the polyimide are shown in Table 1.

The solubility of this polyimide was confirmed by observing the state of the solving after 5% by weight solution was left standing for 12 hours at room temperature. As a result, the polyimide was soluble in solvents of N-methyl-2-pyrrolidone, N,N-dimethylacetamide, N,N-dimethylformamide, dimethylsulfoxide, sulforane, hexamethylphosphoric acid triamide, 1,3-dimethyl-2-imidazolidone, phenol, cresol, xylenol, p-chlorophenol, cyclohexanone, carbitol acetate, diglyme, dioxane, and tetrahydrofuran (THF).

The polyimide was dissolved in THF so as to be a concentration of 20% by weight, the resulting varnish was cast on a glass plate, dried at 100° C. for 10 minutes. This gave almost transparent self-supporting tough film. When the film was bent 180 degree in order to carry out a flexibility test, the film showed good flexibility without cracking.

Example 15

Using 11.64 g (37.5 mmol) of 4,4'-diamino-3,3', 5,5'-tetraethyldiphenylmethane, 3.11 g (12.5 mmol) of 1,3-bis (3-aminopropyl)-1,1,3,3-tetramethyldisiloxne, 20.51 g (50 mmol) of ethylene glycol bistrimellitate dianhydride and 150 ml of N-methyl-2-pyrrolidone, 30.1 g of a polyimide of the fourth aspect comprising the repeating unit represented by the formula (5) was obtained as in Example 1.

The IR spectrum measurement of the resulting polyimide showed typical absorption bands of imide at 1720cm$^{-1}$ and 1780cm$^{-1}$. The results of measuring the molecular weight, glass transition point and temperature of initiating thermal decomposition of the polyimide are shown in Table 1.

The solubility test and the flexibility test of the resulting polyimide determined as in Example 14 gave the results similar to those of Example 14.

Example 16

Using 11.64 g (40 mmol) of 4,4'-diamino-3,3', 5,5'-tetraethyldiphenylmethane, 1.44 g (10 mmol) of octamethylenediamine, 17.91 g (50 mmol) of 3,3', 4,4'-diphenylsulfonetetracarboxylic dianhydride and 150 ml of N-methyl-2-pyrrolidone, 27.1 g of a polyimide of the fourth aspect comprising the repeating unit represented by the formula (5) was obtained as in Example 1.

The IR spectrum measurement of the resulting polyimide showed typical absorption bands of imide at 1720cm$^{-1}$ and 1780cm$^{-1}$. The results of measuring the molecular weight, glass transition point and temperature of initiating thermal decomposition of the polyimide are shown in Table 1.

The solubility test and the flexibility test of the resulting polyimide determined as in Example 14 gave the results similar to those of Example 14.

Example 17

Using 11.64 g (37.5 mmol) of 4,4'-diamino-3,3', 5,5'-tetraethyldiphenylmethane, 3.11 g (12.5 mmol) of 1,3-bis (3-aminopropyl)-1,1,3,3-tetramethyldisiloxane, 17.91 g (50 mmol) of 3,3', 4,4'-diphenylsulfonetetracarboxylic dianhydride and 150 ml of N-methyl-2-pyrrolidone, 27.8 g of a polyimide of the fourth aspect comprising the repeating unit represented by the formula (5) was obtained as in Example 1.

The IR spectrum measurement of the resulting polyimide showed typical absorption bands of imide at 1720cm$^{-1}$ and 1780cm$^{-1}$. The results of measuring the molecular weight, glass transition point and temperature of initiating thermal decomposition of the polyimide are shown in Table 1.

The solubility test and the flexibility test of the resulting polyimide determined as in Example 14 gave the results similar to those of Example 14.

Example 18

Using 12.42 g (40 mmol) of 4,4'-diamino-3,3', 5,5'-tetraethyldiphenylmethane, 2.48 g (10 mmol) of 1,3-bis(3-aminopropyl)-1,1,3,3-tetramethyldisiloxane, 17.91 g (50 mmol) of 3,3', 4,4'-diphenylsulfonetetracarboxylic dianhydride and 150 ml of N-methyl-2-pyrrolidone, 27.8 g of a polyimide of the fourth aspect comprising the repeating unit represented by the formula (5) was obtained as in Example 1.

The IR spectrum measurement of the resulting polyimide showed typical absorption bands of imide at 1720cm$^{-1}$ and 1780cm$^{-1}$. The results of measuring the molecular weight, glass transition point and temperature of initiating thermal decomposition of the polyimide are shown in Table 1.

The solubility test and the flexibility test of the resulting polyimide determined as in Example 14 gave the results similar to those of Example 14.

Example 19

Using 15.52 g (50 mmol) of 4,4'-diamino-3,3', 5,5'-tetraethyldiphenylmethane, 10.75 g (40 mmol) of 3,3', 4,4'-diphenylsulfonetetracarboxylic dianhydride, 4.44 g (10 mmol) of 4,4'-(hexafluoroisopropylidene)diphthalic anhydride and 150 ml of N-methyl-2-pyrrolidone, 27.5 g of a polyimide of the fifth aspect comprising the repeating unit represented by the formula (6) was obtained as in Example 1.

The IR spectrum measurement of the resulting polyimide showed typical absorption bands of imide at 1720cm$^{-1}$ and 1780cm$^{-1}$. The results of measuring the molecular weight, glass transition point and temperature of initiating thermal decomposition of the polyimide are shown in Table 1.

The solubility of this polyimide was confirmed by observing the state of the solving after 5% by weight solution was left standing for 12 hours at room temperature. As a result, the polyimide was soluble in solvents of N-methyl-2-pyrrolidone, N,N-dimethylacetamide, N,N-dimethylformamide, dimethylsulfoxide, sulforane, hexamethylphosphoric acid triamide, 1,3-dimethyl-2-imidazolidone, phenol, cresol, xylenol, p-chlorophenol, cyclohexanone, carbitol acetate, diglyme, dioxane, and tetrahydrofuran (THF).

The polyimide was dissolved in THF so as to be a concentration of 20% by weight, the resulting varnish was cast on a glass plate, dried at 100° C. for 10 minutes. This gave almost transparent self-supporting tough film. When the film was bent 180 degree in order to carry out a flexibility test, the film showed good flexibility without cracking.

Example 20

Using 15.52 g (50 mmol) of 4,4'-diamino-3,3', 5,5'-tetraethyldiphenylmethane, 8.96 g (25 mmol) of 3,3', 4,4'-diphenylsulfonetetracarboxylic dianhydride, 7.36 g (25 mmol) of biphenyltetracarboxylic dianhydride and 150 ml of N-methyl-2-pyrrolidone, 28.5 g of a polyimide of the fifth aspect comprising the repeating unit represented by the formula (6) was obtained as in Example 1.

The IR spectrum measurement of the resulting polyimide showed typical absorption bands of imide at 1720cm$^{-1}$ and 1780cm$^{-1}$. The results of measuring the molecular weight, glass transition point and temperature of initiating thermal decomposition of the polyimide are shown in Table 1.

The solubility test and the flexibility test of the resulting polyimide determined as in Example 19 gave the results similar to those of Example 19.

Example 21

Using 15.52 g (50 mmol) of 4,4'-diamino-3,3', 5,5'-tetraethyldiphenylmethane, 10.26 g (25 mmol) of ethylene glycol bistrimellitate anhydride, 7.36 g (25 mmol) of biphenyltetracarboxylic dianhydride and 150 ml of N-methyl-2-pyrrolidone, 29.8 g of a polyimide of the fifth aspect comprising the repeating unit represented by the formula (6) was obtained as in Example 1.

The IR spectrum measurement of the resulting polyimide showed typical absorption bands of imide at 1720cm$^{-1}$ and 1780cm$^{-1}$. The results of measuring the molecular weight, glass transition point and temperature of initiating thermal decomposition of the polyimide are shown in Table 1.

The solubility test and the flexibility test of the resulting polyimide determined as in Example 19 gave the results similar to those of Example 19.

Example 22

Using 15.52 g (50 mmol) of 4,4'-diamino-3,3', 5,5'-tetraethyldiphenylmethane, 13.43 g (37.5 mmol) of 3,3', 4,4'-diphenylsulfonetetracarboxylic dianhydride, 4.03 g (12.5 mmol) of benzophenonetetracarboxylic dianhydride and 150 ml of N-methyl-2-pyrrolidone, 29.6 g of a polyimide of the fifth aspect comprising the repeating unit represented by the formula (6) was obtained as in Example 1.

The IR spectrum measurement of the resulting polyimide showed typical absorption bands of imide at 1720cm$^{-1}$ and 1780cm$^{-1}$. The results of measuring the molecular weight, glass transition point and temperature of initiating thermal decomposition of the polyimide are shown in Table 1.

The solubility test and the flexibility test of the resulting polyimide determined as in Example 19 gave the results similar to those of Example 19.

Example 23

Using 15.52 g (50 mmol) of 4,4'-diamino-3,3', 5,5'-tetraethyldiphenylmethane, 13.43 g (37.5 mmol) of 3,3', 4,4'-diphenylsulfonetetracarboxylic dianhydride, 3.88 g (12.5 mmol) of diphenyl ether tetracarboxylic dianhydride and 150 ml of N-methyl-2-pyrrolidone, 29.5 g of a polyimide of the fifth aspect comprising the repeating unit represented by the formula (6) was obtained as in Example 1.

The IR spectrum measurement of the resulting polyimide showed typical absorption bands of imide at 1720cm$^{-1}$ and 1780cm$^{-1}$. The results of measuring the molecular weight, glass transition point and temperature of initiating thermal decomposition of the polyimide are shown in Table 1.

The solubility test and the flexibility test of the resulting polyimide determined as in Example 19 gave the results similar to those of Example 19.

Example 24

Using 15.52 g (50 mmol) of 4,4'-diamino-3,3', 5,5'-tetraethyldiphenylmethane, 13.43 g (37.5 mmol) of 3,3', 4,4'-diphenylsulfonetetracarboxylic dianhydride, 4.20 g (12.5 mmol) of 4,4'-(isopropylidene)diphthalic anhydride and 150 ml of N-methyl-2-pyrrolidone, 30.1 g of a polyimide of the fifth aspect comprising the repeating unit represented by the formula (6) was obtained as in Example 1.

The IR spectrum measurement of the resulting polyimide showed typical absorption bands of imide at 1720cm$^{-1}$ and 1780cm$^{-1}$. The results of measuring the molecular weight, glass transition point and temperature of initiating thermal decomposition of the polyimide are shown in Table 1.

The solubility test and the flexibility test of the resulting polyimide determined as in Example 19 gave the results similar to those of Example 19.

Example 25

Using 7.76 g (25 mmol) of 4,4'-diamino-3,3', 5,5'-tetraethyldiphenylmethane, 6.21 g (25 mmol) of 1,3-bis(3-aminopropyl)-1,1,3,3-tetramethyldisiloxane, 10.26 g (25 mmol) of ethylene glycol bistrimellitate anhydride, 8.96 g (25 mmol) of 3,3', 4,4'-diphenylsulfonetetracarboxylic dianhydride and 150 ml of N-methyl-2-pyrrolidone, 26.7 g of a polyimide of the fifth aspect comprising the repeating unit represented by the formula (6) was obtained as in Example 1.

The IR spectrum measurement of the resulting polyimide showed typical absorption bands of imide at 1720cm$^{-1}$ and 1780cm$^{-1}$. The results of measuring the molecular weight, glass transition point and temperature of initiating thermal decomposition of the polyimide are shown in Table 1.

The solubility test and the flexibility test of the resulting polyimide determined as in Example 19 gave the results similar to those of Example 19.

Example 26

Using 6.36 g (25 mmol) of 4,4'-diamino-3,3', 5,5'-tetramethyldiphenylmethane, 7.76 g (25 mmol) of 4,4'-diamino-3,3', 5,5'-tetraethyldiphenylmethane, 8.96 g (25 mmol) of 3,3', 4,4'-diphenylsulfonetetracarboxylic anhydride, 10.26 g (25 mmol) of ethylene glycol bistrimellitate anhydride and 150 ml of N-methyl-2 -pyrrolidone, 30.0 g of a polyimide of the fifth aspect comprising the repeating unit represented by the formula (6) was obtained as in Example 1.

The IR spectrum measurement of the resulting polyimide showed typical absorption bands of imide at 1720cm$^{-1}$ and 1780cm⁻¹. The results of measuring the molecular weight, glass transition point and temperature of initiating thermal decomposition of the polyimide are shown in Table 1.

The solubility test and the flexibility test of the resulting polyimide determined as in Example 19 gave the results similar to those of Example 19

TABLE 1

| | Molecular weight | Glass transition point (°C.) | Temperature of initiating thermal decomposition (°C.) |
| --- | --- | --- | --- |
| Ex. 1 | 49,000 | 367 | 421 |
| Ex. 2 | 41,000 | 282 | 446 |
| Ex. 3 | 37,000 | 232 | 400 |
| Ex. 4 | 31,000 | 200 | 421 |
| Ex. 5 | 81,000 | 252 | 420 |
| Ex. 6 | 89,000 | 226 | 410 |
| Ex. 7 | 40,000 | 210 | 405 |
| Ex. 8 | 39,000 | 260 | 410 |
| Ex. 9 | 25,000 | 290 | 420 |
| Ex. 10 | 38,000 | 250 | 410 |
| Ex. 11 | 38,000 | 240 | 420 |
| Ex. 12 | 25,000 | 240 | 410 |
| Ex. 13 | 25,000 | 240 | 420 |
| Ex. 14 | 26,000 | 186 | 458 |
| Ex. 15 | 23,000 | 160 | 410 |
| Ex. 16 | 46,000 | 253 | 422 |
| Ex. 17 | 69,000 | 224 | 421 |
| Ex. 18 | 69,000 | 235 | 420 |
| Ex. 19 | 46,000 | 274 | 436 |
| Ex. 20 | 56,000 | 290 | 420 |
| Ex. 21 | 55,000 | 239 | 404 |
| Ex. 22 | 55,000 | 280 | 420 |
| Ex. 23 | 55,000 | 280 | 410 |
| Ex. 24 | 27,000 | 260 | 420 |
| Ex. 25 | 17,000 | 185 | 427 |
| Ex. 26 | 67,000 | 250 | 427 |

The measurement of the molecular weigh was carried out using tetrahydrofuran as an eluent and Shodex 80M×2 as columns. The value of the molecular weight is a number average molecular weight which is calculated as polystyrene. The glass transition point was determined by a differential thermal analysis (in a nitrogen atmosphere, heated at 10° C./min.) and the temperature of initiating thermal decomposition was determined by a thermogravimetry (in a nitrogen atmosphere, heated at 10° C./min.).

We claim:

1. A polyimide comprising a repeating unit represented by the formula (1) and having a number average molecular weight of from 4,000 to 200,000

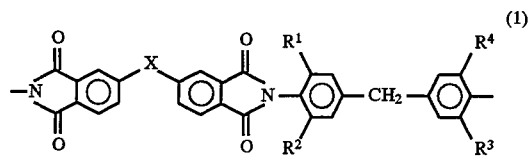

wherein X is —SO₂— or —C(=O)—OCH₂CH₂O —C(=O)—, and R¹, R², R³ and R⁴ are independently an alkyl group having 1 to 4 carbon atoms or an alkoxy group having 1 to 4 carbon atoms.

2. A polyimide as claimed in claim 1, wherein the repeating unit represented by the formula (1) consisting of repeating units represented by the formulae (2) and (3)

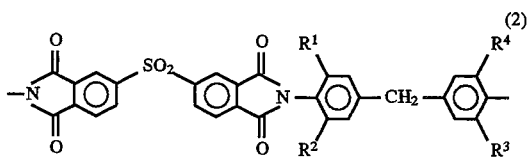

wherein R¹, R², R³ and R⁴ are independently an alkyl group having 1 to 4 carbon atoms, or an alkoxy group having 1 to 4 carbon atoms

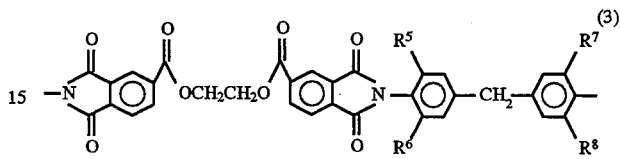

wherein R⁵, R⁶, R⁷ and R⁸ are independently an alkyl group having 1 to 4 carbon atoms, or an alkoxy group having 1 to 4 carbon atoms.

3. A polyimide as claimed in claim 1, which comprises the above repeating unit represented by the formula (1) and a repeating unit represented by the formula (4), and having a number average molecular weight of 4,000 to 200,000;

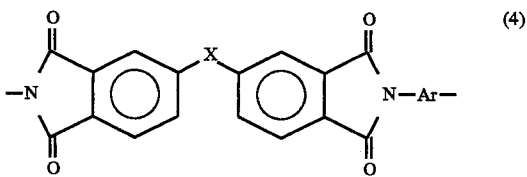

wherein X is —SO₂— or —C(=O)—OCH₂CH₂O —C(=O)—, and Ar is a divalent group having 1 to 6 benzene rings, provided that Ar represented by the following formula is excluded out

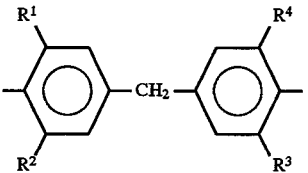

wherein R¹, R², R³ and R⁴ are independently an alkyl group having 1 to 4 carbon atoms, or an alkoxy group having 1 to 4 carbon atoms.

4. A polyimide as claimed in claim 3, wherein the proportion of the repeating unit represented by formula (1) is from 40 to 99 mol %, and that of the repeating unit represented by formula (4) is from 60 to 1 mol %.

5. A polyimide as claimed in claim 3, wherein the repeating unit represented by the formula (1) consisting of repeating Units represented by the formulae (2) and (3).

6. A polyimide as claimed in claim 1, which comprises the above repeating unit represented by the formula (1) and a repeating unit represented by the formula (5), and having a number average molecular weight of 4,000 to 200,000

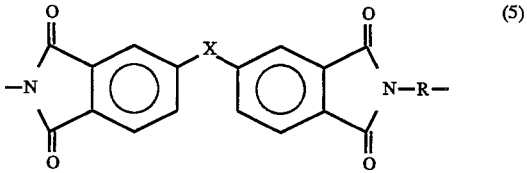

wherein X is —SO₂— or —C(=O)—OCH₂CH₂O—C(=O)—, and R is an alkylene group having 2 to 20 carbon atoms or a dimethylsiloxane group represented by the formula: —R'—[Si(CH₃)₂O]ₙSi(CH₃)₂—R'— where R' is an alkylene group having 1 to 10 carbon atoms or phenoxymethylene group and n is an integer of from 1 to 20.

7. A polyimide as claimed in claim 6, wherein the proportion of the repeating unit represented by the formula (1) is from 40 to 99 mol %, and that of the repeating unit represented by formula (5) is from 60 to 1 mol %.

8. A polyimide as claimed in claim 6, wherein the repeating unit represented by the formula (1) consisting of repeating units represented by the formulae (2) and (3).

9. A polyimide as claimed in claim 1, which comprises the above repeating unit represented by the formula (1) and a repeating unit represented by the formula (6), and having a number average molecular weight of 4,000 to 200,000

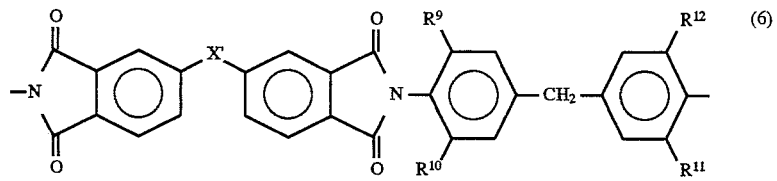
(6)

wherein X' is a direct bond, —O—, —C(=O)—, —C(CH₃)₂—, or —C(CF₃)₂—, and R⁹, R¹⁰, R¹¹ and R¹² are independently an alkyl group having 1 to 4 carbon atoms or an alkoxy group having 1 to 4 carbon atoms.

10. A polyimide as claimed in claim 9, wherein the proportion of the repeating unit represented by the formula (1) is from 40 to 99 mol %, and that of the repeating unit represented by the formula (6) is from 60 to 1 mol %.

11. A polyimide as claimed in claim 9, wherein the repeating unit represented by the formula (1) comprises repeating units represented by the formulae (2) and (3).

12. A process for producing a polyimide of claim 1, comprising reacting a tetracarboxylic dianhydride represented by the above formula (7) with a compound represented by the following formula (8);

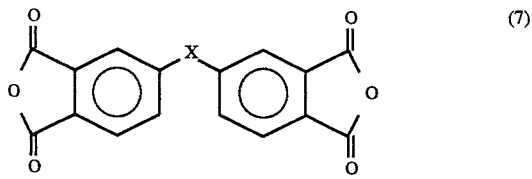
(7)

wherein X is —SO₂— or —C(=O)—OCCCH₂CH₂O—C(=O)—

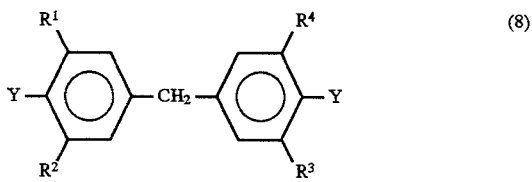
(8)

wherein R¹, R², R³ and R⁴ are independently an alkyl group having 1 to 4 carbon atoms, or an alkoxy group having 1 to 4 carbon atoms and Y is an amino group or isocyanate group.

13. A process for producing a polyimide of claim 3, comprising reacting a tetracarboxylic dianhydride represented by the above formula (7) with a compound represented by the above formula (8) and a compound represented by the following formula (9);

Y—Ar—Y (9)

wherein Ar is a divalent group having 1 to 6 benzene rings and Y is amino group or isocyanate group, provided that the Ar represented by the following formula is excluded out,

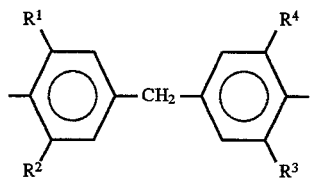

wherein R¹, R², R³ and R⁴ are independently an alkyl group having 1 to 4 carbon atoms, or an alkoxy group having 1 to 4 carbon atoms.

14. A process for producing a polyimide of claim 6, comprising reacting a tetracarboxylic dianhydride represented by the above formula (7) with a compound represented by formula (8) and a compound represented by the following formula (10);

Y—R—Y (10)

wherein R is an alkylene group having 2 to 20 carbon atoms or a dimethylsiloxane group represented by the formula: —R'—[Si(CH₃)₂O]ₙSi(CH₃)₂—R'— where R' is an alkylene group having 1 to 10 carbon atoms or phenoxymethylene group and n is an integer of from 1 to 20, and Y is an amino group or isocyanate group.

15. A process for producing a polyimide of claim 9, comprising reacting a tetracarboxylic dianhydride represented by formula (7) with a compound represented by the above formula (8) and a compound represented by the following formula (11);

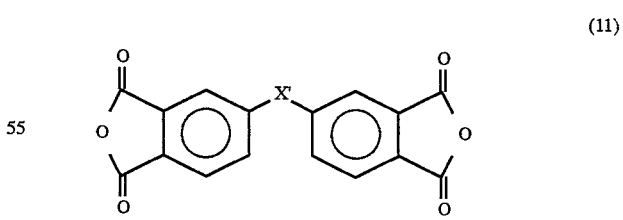
(11)

wherein X' is a direct bond, —O—, —C(=O)—, —C(CH₃)₂— or —C(CF₃)₂—.

* * * * *